March 11, 1969  D. J. MORANTZ  3,432,766
APPARATUS FOR PRODUCING STIMULATED EMISSION OF RADIATION
Filed March 13, 1964  Sheet 1 of 2
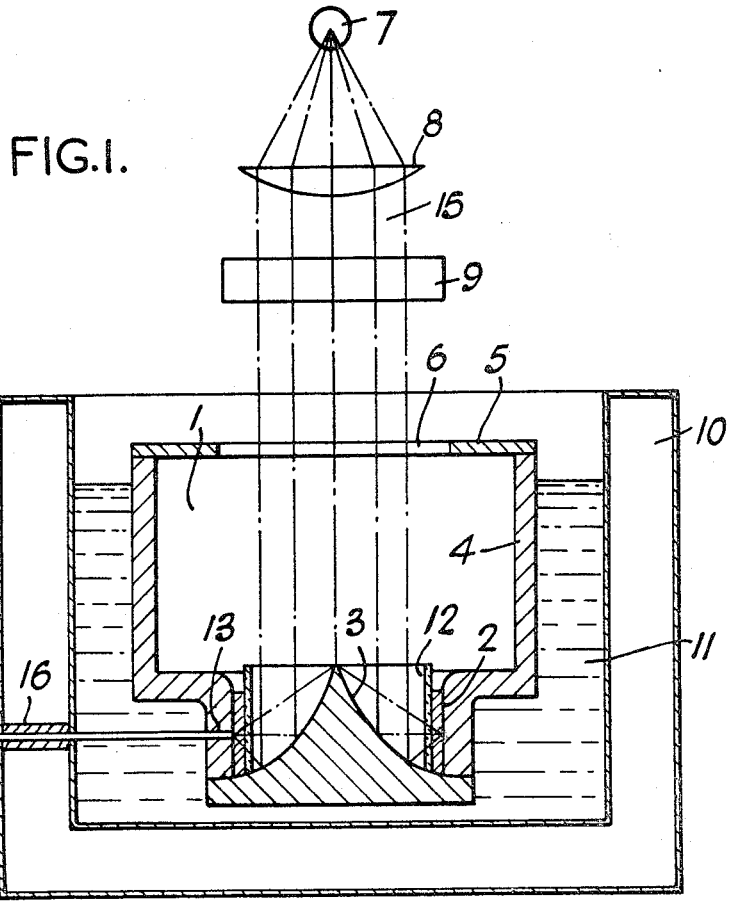
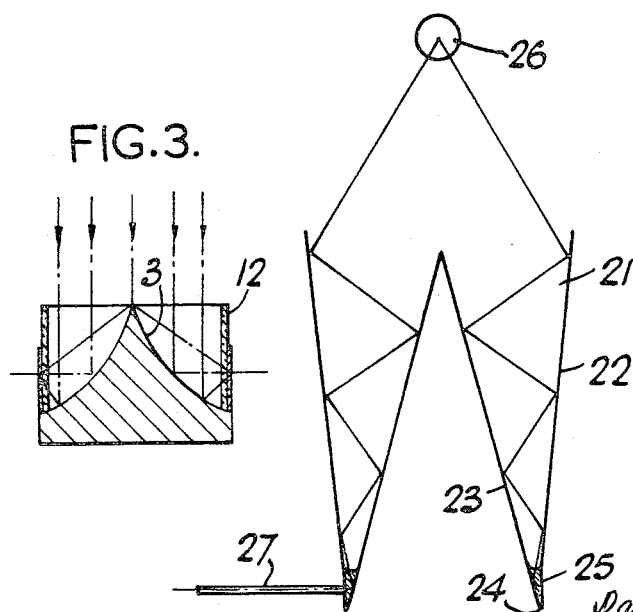
Inventor
Daniel Joseph Morantz
By Cushman, Darby & Cushman
Attorneys

United States Patent Office 3,432,766
Patented Mar. 11, 1969

3,432,766
APPARATUS FOR PRODUCING STIMULATED
EMISSION OF RADIATION
Daniel Joseph Morantz, Rochester, Kent, England, assignor to National Research Development Corporation, London, England, a British corporation
Continuation-in-part of application Ser. No. 340,903, Jan. 29, 1964. This application Mar. 13, 1964, Ser. No. 351,647
Claims priority, application Great Britain, Feb. 1, 1963, 4,343/63; Mar. 15, 1963, 10,435/63
U.S. Cl. 331—94.5                              9 Claims
Int. Cl. H01s 3/00, 1/00; G02b 5/14

ABSTRACT OF THE DISCLOSURE

In optical maser apparatus, a curved internally reflecting surface, such as a cylinder, has a curvature to allow radiation to propagate along a substantially curved path, such as a circle or a spiral, which extends through a negative temperature medium. A further externally reflecting surface, such as a parabolic cusp or further spiral, focusses pumping radiation incident at right angles to the plane of said path into a small volume practically coincident with said path to produce stimulated emission of radiation. Coherent radiation is derived by arranging for said stimulated radiation to traverse repetitively said path in a resonant structure, or by passing incident coherent radiation along said path to force said stimulated radiation into coherence to produce the effect of a light amplifier.

---

This application is a continuation-in-part of my copending application Ser. No. 340,903, filed Jan. 29, 1964, and now abandoned, which is incorporated hereinto by reference.

This invention relates to radiation reflecting systems and is also concerned with apparatus for producing stimulated emission of radiation in the visible and near visible regions. Such apparatus has become known as laser apparatus.

The requirements for such apparatus are means for directing input energy from a source onto active material to produce population inversion of the energy levels of the active material and a resonant structure in which multiple reflections are produced to stimulate the active material to emit radiation.

According to the present invention the resonant structure comprises a cylindrical internally reflecting surface and means are provided for containing active material in contact with said surface so that emission of radiation in the material is repeatedly reflected round the reflecting surface to stimulate emission of radiation in the so-called "whispering gallery" mode. Output from the apparatus can be taken by means of a light pipe extending tangentially to the surface.

According to the invention a radiation reflecting system comprises a curved internally reflecting surface the curvature of which enables radiation to be propagated along a curved path practically coincident with said surface by continuous reflection grazing incidence, and means enabling such radiation to repetitively traverse said path.

To enable such repetitive traversal to be obtained the path may be a closed path, for example a circular path. Alternatively reflectors may be spaced apart along said path causing radiation to be repeatedly reflected to and fro along said path.

Such a system has application as a resonant structure in laser apparatus. Such apparatus requires means for directing input energy from a source onto active material to produce population inversion of the energy levels of the active material and a resonant structure in which multiple reflections are produced to stimulate the active material to emit radiation. By arranging that the path for the reflected radiation passes through active material which may be solid, liquid or gaseous, laser action may be obtained. The active material may be in the form of a heavy oil or grease or be deposited as a multimolecular or monomolecular layer.

An additional feature of the invention is the provision of a radiation focussing system for directing input radiant energy from a suitable source onto active material in the vicinity of said curved reflecting surface. In one embodiment, where the curved internally reflecting surface is cylindrical in shape, the focussing system comprises an externally reflecting paraboloid cusp located axially with respect to said cylindrical internally reflecting surface and arranged to focus incident parallel light rays into a narrow annular ring of light coinciding with the location of said internal reflecting surface. The two reflecting surfaces may conveniently cooperate to define a container for the active material.

In another embodiment two cooperating reflecting surfaces are provided for both focussing incident radiation from a source and enabling any radiation occurring in active material to traverse a resonant structure. In this embodiment one surface comprises a generally conical shaped externally reflecting surface positioned within the volume defined by a cylindrical or tapering internally reflecting surface. The two surfaces meet in an annular junction in the region of which the surfaces define a container for the active material.

The internally reflecting surface may be provided by the internal curved wall of a container or alternatively may be provided within active material itself by means of total internal reflection in a medium having an externally curved boundary surface with a medium of lower refractive index.

Where the curved internally reflecting surface is not closed it may conveniently be arranged in spiral form so as to provide the maximum path length for radiation in a given volume. One or other of the reflectors at the ends of such a curved path, generally the one at the outer end of the spiral, may be partially reflecting in order that a radiation output can be obtained from it.

Where the internally reflecting surface is tapered it requires to be modified to a cylindrical surface where it is in contact with the active material to enable the "whispering gallery" mode to be set up. If a light from a source is directed axially between the reflecting surfaces successive reflections from each surface in turn will cause the light to be concentrated in the annular junction region where the active material is situated.

In order that the invention may be more fully understood reference will now be made to the accompanying drawings in which:

FIG. 1 illustrates in section laser apparatus embodying the invention,

FIG. 2 illustrates an alternative arrangement to that shown in FIG. 1,

FIG. 3 illustrates a modification of the FIG. 1 arrangement in which total internal reflection occurs in the active material.

Figure 4:
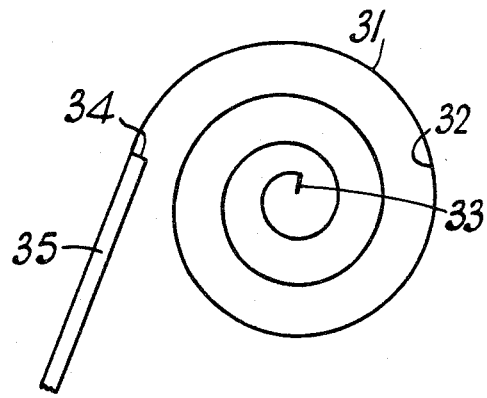
FIG. 4 illustrates diagrammatically a reflecting system in spiral form.

Referring to FIG. 1 there is shown therein apparatus for producing stimulated emission of radiation in the visible or near visible region. Such apparatus has become to be generally known as laser apparatus. The apparatus comprises a cell 1 having a cylindrical wall 2 which is highly polished so as to provide an internally reflecting surface. The base 3 of the cell is also a highly polished surface and is shaped to form a paraboloid cusp, that is, the surface of base 3 is described by rotating a barabola, the axis of which coincides with the surface of the wall 2, about the axis of the cylinder defined by the wall 2. If light is directed in the form of parallel rays onto the base 3 in a direction parallel to the axis of the cylinder it will be reflected from the base 3 and focussed onto the wall 2 of the cell 1 in the form of a very narrow annular ring of light. The cell walls may be extended upwards at a greater radius by sides 4 and may be enclosed by means of a lid 5 which includes a transparent window 6.

The apparatus is provided with an intense compact light source 7 positioned at the focal point of a lens 8 so that the output from source 7, when passed through lens 8 emerges in the form of parallel rays 15. These rays can be passed through a suitable filter 9 to allow passage of only those spectral regions which will induce excitation in the active material of the laser.

The entire cell 1 can be contained within a thermally insulated container such as a vacuum Dewar flask 10 and a suitable refrigerant 11 can be provided between the cell 1 and the insulated container. The interior of cell 1 may be evacuated or flushed with dry gas.

The active material can be in gaseous, liquid or solid form and can fill the entire lower portion of the cell 1. To prevent reflection losses at the surface of the material when in liquid or solid form it can be covered with successive layers of materials whose refractive indices increase in the direction of incident light in the ratio of $1:\sqrt{2}$. However, if required and to reduce the amount of active material that is used, a transparent retaining cylinder 12 can be provided which is positioned within the space defined by the walls 2. The retaining cylinder 12 can have the same refractive index as the active material. Alternatively to reduce reflection losses a composite retaining cylinder can be provided consisting of concentric layers whose refractive indices increase in the direction of incident light in the ratio of $1:\sqrt{2}$.

In an alternative arrangement the window 6 can be replaced by an evacuated cylinder having transparent end walls or solid light pipe extending downwards into cell 1.

To obtain an output from the laser cell a tangential drill hole 13 is provided extending through the cell wall 2 and this hole contains a light pipe 14 which passes out through a gland 16 in the wall of the containing vessel 10. If the device is to be used as an amplifier additional drill holes containing light pipes can also be provided.

In a particular form of the invention the active material may be contained within an optical fibre and this fibre can pass into the cell through one drill hole, be looped round the cell at the position of the focussed ring of light and then passed out of the cell through another drill hole. Such a construction is particularly convenient where the device is to be used as an amplifier.

FIG. 2 illustrates an alternative arrangement to the cell 1 of FIG. 1. In FIG. 2 a cell 21 is formed by an outer wall 22 having a frusto-conical shape and having an internally reflecting surface. Within the volume defined by wall 22 there is positioned a cone shaped externally reflecting surface 23 arranged to meet wall 22 at an annular junction 24. Wall 22 is modified for a short distance before the junction 24 to form a cylindrical surface 25. If light from a source 26 is now directed into the open mouth of the cell 21 then all the light will be collected at the annular junction region 24 by means of successive reflections from the two surfaces 22 and 23 in turn.

Active material is contained within cell 21 in the region of the junction 24 and when energised by incident light will enable stimulated emission of radiation to be produced in "whispering gallery" modes round the surface of the cylindrical portion 25. As in the previous embodiment this radiation can be fed out of the cell through a light pipe 27 extending tangentially to the surface of cylinder 25.

While the outer wall 22 is shown as being of tapered form it will be appreciated that it can be cylindrical if desired and be continuous with the cylindrical portion 25.

It will be understood that the cell 21 can be immersed within a suitable refrigerating vessel as in the FIG. 1 embodiment.

The nature of the reflecting surfaces 2 and 25 is chosen in accordance with the frequency or frequencies that it is desired to stimulate. Thus where these frequencies are in the visible region a highly polished surface of, for instance, stainless steel will suffice. For stimulation of infra-red frequencies other reflectors may be used, for instance a dielectric multilayer.

In order to improve operational stability the internally reflecting cylindrical surface around which the "whispering gallery" modes are set up can be provided with a narrow hollow-ground band forming a very shallow channel.

While in the above described embodiments the incident radiation is shown as derived from a single point source it will be understood that radiation from the sun the rays of which are practically parallel may be used if required.

Referring now to FIG. 3 there is shown therein an arrangement similar to FIG. 1 and like parts have like reference numerals. In this arrangement, as in the FIG. 1 arrangement, a base 3 of paraboloid cusp shape is provided arranged to receive incident radiation and focus it into a narrow annular beam. A transparent retaining cylinder 12 is provided located just within the beam and embraced by it and active material in which laser action can occur is provided round the external surface of cylinder 12 so that any radiation generated within the active material will be propagated round its external boundary surface by continuous total internal reflection. The active material may be solid or a liquid held by surface attraction or may be in grease form.

Referring now to FIG. 4, there is shown therein a plan view of a planar strip of metallic foil 31 wrapped into a spiral form. At least the inner surface 32 of the strip is arranged to reflect light at the operating frequency of the laser. A plain reflecting mirror 33 is provided at the inner end of the spiral and a partially reflecting mirror 34 is provided at the outer end of the spiral from which a rectangular light pipe 35 is taken as the output connection from the device.

The entire structure can be immersed in a liquid which forms the active laser material or contained in a vessel in which gaseous active material is provided. Alternatively solid active material can be provided in the space between successive turns of the spiral or deposited on the inner surface 32 of the foil 31.

The structure can for example be energised from a light source directed axially and with such an arrangement it may be convenient to provide a light reflecting base to enhance the intensity of illumination of the active material. If the light input energy is arranged to be converging then the external surface of the foil 31 may be used to reflect some of the light onto the active material.

It is not necessary for the spiral to be equiangular provided that there are no regions of negative radius of curvature or kinks. It is also not necessary for the surface 32 to be cylindrical but it can be slightly concave inwardly to assist in focussing the light.

Figure 5:
FIG. 5 illustrates a cross section of a possible arrangement of the spiral of FIG. 4.
Figure 6:
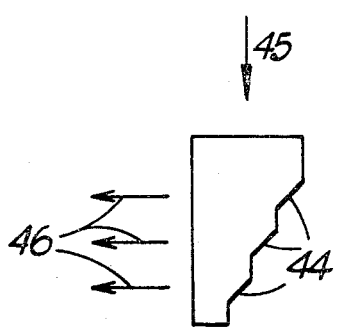
FIG. 6 illustrates input means where the apparatus is used as an amplifier.

In order to assist light collection the active material can be confined within channels of section as illustrated in FIG. 5. Here the wall 41 forms the internally reflecting surface and a further surface 42 which is positioned at an angle to the direction of the incoming light is provided and the surface 41 and 42 together define a channel for the active material. It will be understood that this channel has a spiral form as illustrated generally in FIG. 4. Surface 42 may be curved to assist in focussing the incident light onto the wall 43 and a convenient shape is parabolic.

Where the apparatus is used as an amplifier the input connection can extend axially of the spiral and an input coupling connection used at the inner end of the spiral is shown in FIG. 6. With this arrangement a plurality of reflecting surfaces 44 are provided which reflect an input signal incident in the direction of arrow 45 axially of the spiral into paths 46 which enter into the spiral resonant structure.

The spiral reflecting system illustrated in FIG. 4 may be constructed by a number of methods. For example a continuous composite strip comprising active material and a reflecting surface may be formed. Where the active material is of solid form or is incorporated in a solid carrier the reflecting surface can be deposited thereon. Alternatively a metallic coil strip can be used as the reflecting surface and the active material deposited thereon. The composite strip can then be wound to form the desired spiral aspect.

In an alternative form of construction a spiral groove can be machined in the surface of a block of suitable material. Alternatively again the spiral can be formed by printed circuit techniques and if desired the space between adjacent turns of the spiral can be deepened by etching or finer machining using laser techniques.

Two spiral structures may be joined in stroll-like fashion, in which case the outer mirrors may be dispensed with.

While in all the above described embodiments the radiation reflecting system is illustrated as acting as the resonant structures for laser apparatus it will be appreciated that if photoionisable material is used in place of laser material then on the incidence of radiation ionisation occurs. Due to the greater mobility of the electrons produced by the ionisation compared with the positive ions, the electrons will migrate towards the outer surface. Thus if electrodes are radially spaced apart on opposite sides of active material an electrical output can be obtained. Where the sun is used as the source of incident radiation direct conversion of sunlight into electricity can thus be obtained.

Where the active material is gaseous or liquid it can be continuously replenished for example due to deposition of the active material as a result of photochemical decomposition.

It is possible to frequency modulate the output from the apparatus by electric or magnetic fields applied via the reflecting surface e.g. by passing a current flow along the surface or by magnetic precoding as with magnetic tape.

I claim:

1. Apparatus for producing stimulated emission of radiation comprising:
   a curved internally reflecting surface, the curvature of which enables radiation to be propagated along a substantially curved path lying substantially in a single plane;
   an active material capable of exhibiting a negative temperature condition, said curved path extending through said active material;
   a pumping source for pumping said active material with radiation in a direction substantially perpendicular to said plane at a frequency corresponding to the frequency required to establish a negative temperature condition within said material;
   a curved externally reflecting surface operating to focus said pumping radiation into a small volume lying in said plane and substantially coincident with said path;
   means for deriving from stimulated radiation produced in said active material coherent radiation which traverses along said path; and
   means for extracting the coherent radiation from the apparatus along a path substantially tangential to said curved path.

2. Apparatus for producing stimulated emission of radiation comprising:
   a curved internally reflecting surface, the curvature of which enables radiation to be propagated along a substantially circular path;
   an active material capable of exhibiting a negative temperature condition, said path extending through said active material;
   a pumping source for pumping said active material with radiation in a direction substantially perpendicular to the plane of said path, said radiation having a frequency corresponding to the frequency required to establish a negative temperature condition in said active material;
   a curved externally reflecting surface operating to focus said pumping radiation into a small volume substantially coincident with said path, said further surface being in the shape of a paraboloidal cusp the surface of which can be generated by rotating a segment of a parabola about a line parallel to its axis and spaced therefrom, the arrangement being such that the said path is substantially concident with a circle generated by the focal point of the said parabola during the said rotation of the parabola which generates the paraboloidal cusp, the radiation from the pumping source being arranged to be parallel to the axis of the cusp-shaped reflecting surface and to be focussed by that surface substantially onto the said path;
   means for deriving from stimulated radiation which is produced in said active material coherent radiation which traverses along said path; and
   means for extracting the coherent radiation from the apparatus along a path substantially tangential to said circular path.

3. Apparatus for producing stimulated emission of radiation according to claim 2 wherein stimulated radiation propagated along said substantially circular path is practically concident with said reflecting surface by continuous reflection at grazing incidence, and the means for deriving coherent radiation comprises a resonant structure comprising the said curved reflecting surface, the arrangement being such that stimulated radiation repetitively traverses substantially the same path the length of which is such that coherent radiation is derived from the stimulated radiation.

4. Apparatus for producing stimulated emission of radiation according to claim 2 wherein the active material is in the form of a fiber which is arranged in a number of loops so that the said curved internally reflecting surface is constituted by the internal surface of the fiber along which radiation is reflected by total internal reflection, and the means for extracting the coherent radiation for the apparatus is constituted by means for passing coherent radiation through the fiber, the arrangement being such that the coherent radiation passing through the fiber is amplified by the stimulated radiation.

5. Apparatus for producing stimulated emission of radiation comprising:
   a tapered cylindrical internally reflecting surface, the curvature of which enables radiation to be propagated along a substantially circular path;
   an active material capable of exhibiting a negative temperature condition, said path extending through said active material;
   a pumping source for pumping said active material with radiation in a direction substantially perpendicular to said plane at a frequency corresponding to the frequency required to establish a negative temperature condition within said material;
   a curved externally reflecting surface comprising a conical externally reflecting surface coaxial with the first said reflecting surface to intersect therewith, and operating therewith to focus said pumping radiation into a small volume practically coincident with said curved path and lying substantially at the intersection of the two surfaces;

means for deriving from stimulated radiation which is produced in said active material coherent radiation which traverses along said path; and means for extracting the coherent radiation from the apparatus along a path substantially tangential to said circular path.

6. Apparatus for producing stimulated emission of radiation according to claim 5 wherein stimulated radiation propagates along said substantially circular path practically coincident with said reflecting surface by continuous reflection at grazing incidence, and the means for deriving coherent radiation comprises a resonant structure comprising the said curved reflecting surface, the arrangement being such that stimulated radiation repetitively traverses substantially the same path the length of which is such that coherent radiation is derived from the stimulated radiation.

7. Apparatus for producing stimulated emission of radiation according to claim 5 wherein the active material is in the form of a fiber which is arranged in a number of loops within said curved internally reflecting surface and the means for extracting the coherent radiation from the apparatus is constituted by means for passing coherent radiation through the fiber, the arrangement being such that the coherent radiation passing through the fiber is amplified by the stimulated radiation.

8. Apparatus according to claim 1 wherein said curved internally reflecting surface is in the form of a spiral having two reflecting elements positioned one at each end of said path to enable radiation to be reflected repeatedly to and fro along the path.

9. Apparatus according to claim 1 wherein said curved internally reflecting surface and said curved externally reflecting surface are formed by mutually inclined inner faces of a spiral channel and wherein there are provided two reflecting elements positioned one at each end of said path to enable radiation to be reflected repeatedly to and fro from the path.

References Cited

UNITED STATES PATENTS

| | | | |
|---|---|---|---|
| 2,741,691 | 4/1956 | Lee | 350—199 |
| 3,140,451 | 7/1964 | Fox | 331—94.5 |
| 3,223,944 | 12/1965 | Luck | 331—94.5 |
| 3,230,474 | 1/1966 | Keck et al. | 331—94.5 |
| 3,297,958 | 1/1967 | Weiner | 331—94.5 |
| 3,241,085 | 3/1966 | Marcatili | 331—94.5 |

FOREIGN PATENTS 29,282 of 1909 Great Britain.

OTHER REFERENCES

E. Snitzer: "Proposed Cavities for Optical Masers," Jour. Ap. Physics vol. 32, No. 1, January 1961, pages 36–39.

Wolff: Field Modulates Laser, Electronics (Apr. 26, 1963) pp. 26 and 27.

JEWELL H. PEDERSEN, *Primary Examiner.*

W. L. SIKES, *Assistant Examiner.*

U.S. Cl. X.R.

350—294, 96